T. W. Johnson.
Extracting Tan Bark.
Nº 82,121. Patented Sept. 15, 1868.
Fig: 1.
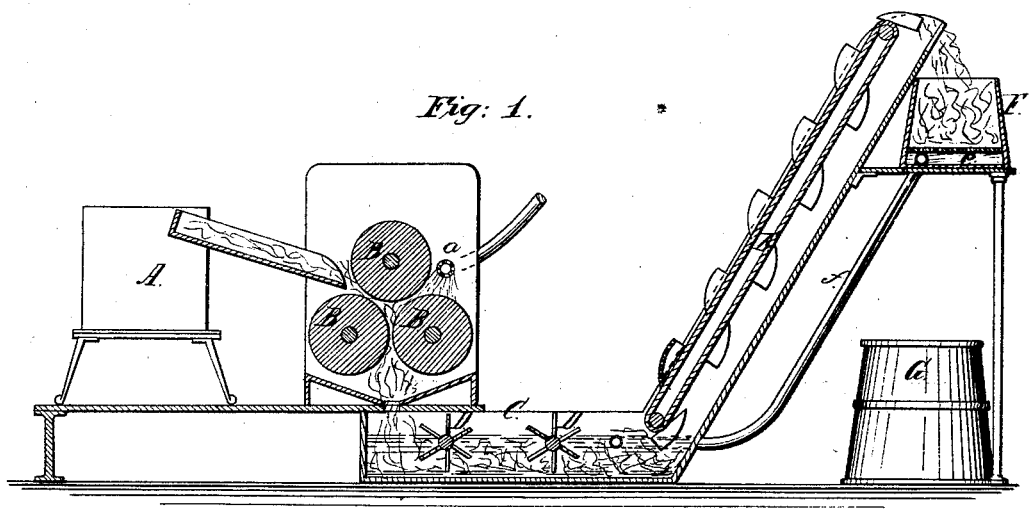
Fig: 2.
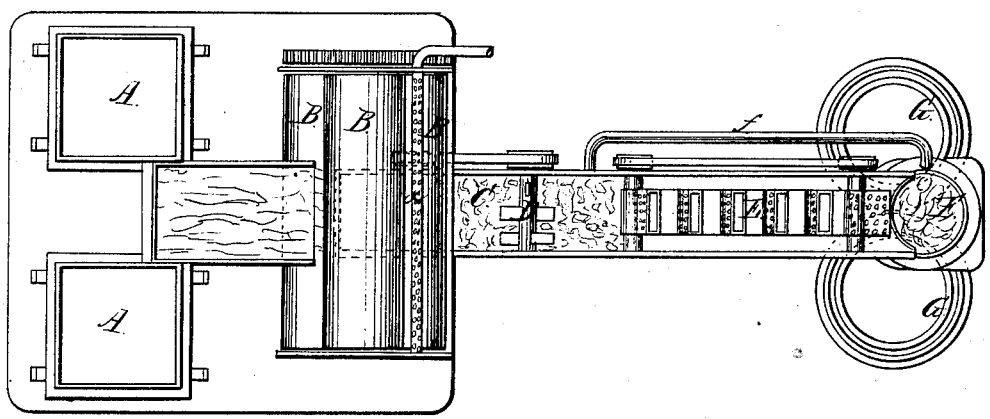
Witnesses:
E. F. Kastenhuber
Chas. Wahlers.
Inventor:
Thomas W. Johnson
per
Van Santvoord & Hauff
att'ys

UNITED STATES PATENT OFFICE.

THOMAS W. JOHNSON, OF NEW YORK, N. Y.

IMPROVEMENT IN EXTRACTING TAN-BARK.

Specification forming part of Letters Patent No. 82,121, dated September 15, 1868.

*To all whom it may concern:*

Be it known that I, THOMAS W. JOHNSON, of the city, county, and State of New York, have invented a new and useful Improvement in Extracting Tan-Bark; and I do hereby declare the following to be a full, clear, and exact description, which will enable those skilled in the art to make and use the same, reference being had to the accompanying drawing, forming part of this specification, in which drawing—

Figure 1 represents a longitudinal section of this invention. Fig. 2 is a plan or top view thereof.

Similar letters indicate corresponding parts.

This invention consists in saturating the bark in chips, passing it through rollers into a saturating-tank, exposing it in said tank to the action of beaters, elevating and passing it through a series of leaches, and finally washing it repeatedly until all the astringent properties contained therein are taken up by the wash, a constantly fresh supply of crushed bark being passed through the saturating-tank, while the disintegrated bark is separated from the liquid absorbed by it while passing through the saturating-tank by the action of perforated buckets on the elevator, and by that of the leach, which receives the bark as the same is discharged from said elevator, the liquid absorbed by the disintegrated bark being drained off by the perforated elevator-buckets, and by the perforated bottom of the receiving-leach, and returned to the saturating-tank in such a manner that the strength of the extract can be increased to any desired degree, and the process of producing a concentrated extract of tan-bark or other similar material can be effected with comparatively little labor, and with the least possible waste.

In carrying out my invention, I first soak the bark in the chip, or in its crude form, by placing it in the tanks A, where it is softened in water, which may be heated by the action of steam or otherwise. After the bark has been softened, it is passed through the rollers B, and while the bark is passing through these rollers a jet of water or weak tanning-liquor may be thrown on it by means of the perforated pipe *a*.

By the action of the rollers B the fiber of the bark is disintegrated, and in this state the bark drops into the tank C, which is kept full of liquor heated to any desired degree. In this tank the bark previously disintegrated by the action of the rollers B is exposed to the action of the beaters D until it becomes a soft and pulpy mass. It is then carried up a distance of twenty or thirty feet by an elevator, E, with perforated or wire buckets, allowing the liquor to drain back through the perforations or meshes of said buckets into the saturating-tank, while the bark is carried up and deposited into a suspended or elevated tank, F. This tank is provided with a perforated false bottom, through which the liquors still contained in the bark, and drained off therefrom in said tank, are made to collect in the compartment *e*, whence they are carried back to the saturating-tank by pipe *f*. By these means the quantity of the liquid in the saturating-tank is but little reduced, while its degree of saturation constantly increases by the fresh bark made to pass through it, as previously stated.

From the saturating-tank F the bark is transferred into the leaches G, which are situated in a convenient position below the tank F, and the number of which may be increased to any desired extent. Said leaches are provided with perforated false bottoms, and they are intended to be suspended or elevated for the convenience of casting or emptying the same, which is down through suitable manholes in their sides.

The bark in these leaches is washed with fresh water, as follows: Hot water is passed into the first leach, underneath the false bottom, until the leach is filled, the water being compelled to percolate up through the bark. From the top of the first leach extends a conductor under the false bottom of the second leach, and the liquor from the first leach, passing through this conductor, acts on the bark in the second leach, and so on until all the leaches are filled, and the bark contained therein is thoroughly washed.

By this time the bark in the first leach is thoroughly spent of its tanning properties. The leach is then cast out and filled with fresh bark, and fresh water is let onto the second leach, and then the circulation is kept up in regular rotation; or, when the leaches are filled with bark in the manner described, hot water is passed onto the bark in the first leach, and, passing down through the bark into the false bottom, it rises through a conductor to the top of the next leach, over which it flows in the same manner as described in the first leach, and so on until the washing of the first leach has percolated all the bark in the several leaches. By this time the bark in the first leach has been thorougly spent of its tanning properties. The leach is then cast and filled with fresh bark, and the same process as before described is continued.

When the liquors by these means have attained the highest degree of strength they are run off into a receiving-tank, from which they are pumped into the saturating-tank, and are thus kept in circulation until a sufficient quantity of bark has passed through them to bring them to as high a degree of strength as the tanner may require for his packs of leather in their several stages while being tanned, or as the manufacturer of extract may desire for condensation into extracts.

By this process the astringent properties of the bark can be extracted in a short time with little labor, and with the least possible waste.

I disclaim everything shown and described in the patent of Benjamin Irwin, April 30, 1867; but,

Having thus described my invention, what I claim as new, and desire to secure by Letters Patent, is—

1. The within-described process of extracting tan-bark by softening the bark in chips, passing it through rollers into the saturating-tank, exposing it in said tank to the action of beaters, elevating and passing it through a series of leaches, where it is washed repeatedly until all the astringent properties contained therein are taken up by the wash, substantially as set forth.

2. Passing a constantly fresh supply of crushed bark through the saturating-tank and exposing it therein to the action of beaters, substantially as and for the purpose described.

3. Separating the disintegrated bark from the liquid absorbed by it while passing through the saturating-tank by the action of the perforated buckets on the elevator, and by that of the leach, which receives the bark as the same is discharged from said elevator, the liquid absorbed by the disintegrated bark being drained off by the perforated elevator-buckets and by the perforated bottom of the receiving-leach, and returned to the saturating-tank, substantially as set forth.

THOS. W. JOHNSON.

Witnesses:
W. HAUFF,
E. F. KASTENHUBER.